United States Patent
Fernando et al.

(10) Patent No.: US 9,152,451 B2
(45) Date of Patent: Oct. 6, 2015

(54) METHOD OF DISTRIBUTING PROCESSOR LOADING BETWEEN REAL-TIME PROCESSOR THREADS

(71) Applicant: GM GLOBAL TECHNOLOGY OPERATIONS LLC, Detroit, MI (US)

(72) Inventors: Jana M Fernando, Torrance, CA (US); Steven E. Schulz, Torrance, CA (US); Brian A Welchko, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 294 days.

(21) Appl. No.: 13/733,475

(22) Filed: Jan. 3, 2013

(65) Prior Publication Data

US 2014/0189709 A1    Jul. 3, 2014

(51) Int. Cl.
*G06F 9/46* (2006.01)

(52) U.S. Cl.
CPC ........................................ *G06F 9/46* (2013.01)

(58) Field of Classification Search
None
See application file for complete search history.

(56) References Cited

U.S. PATENT DOCUMENTS

| | | | | |
|---|---|---|---|---|
| 6,189,022 | B1 * | 2/2001 | Binns | 718/100 |
| 7,020,877 | B2 * | 3/2006 | Dailey | 718/102 |
| 8,615,765 | B2 * | 12/2013 | Jensen et al. | 718/104 |

* cited by examiner

*Primary Examiner* — Lewis A Bullock, Jr.
*Assistant Examiner* — Jacob Dascomb
(74) *Attorney, Agent, or Firm* — Quinn Law Group, PLLC

(57) ABSTRACT

A method of distributing processor loading in a real-time operating system between a high frequency processing task and a lower frequency processing task, the method including: making a processing request to the high frequency processing task from the lower frequency processing task, the processing request including a plurality of discrete processing commands; queuing the plurality of discrete processing commands; and executing a subset of the queued processing commands with the execution of each of a plurality of high frequency processing tasks such that the execution of the plurality of discrete processing commands is distributed across the plurality of high frequency processing tasks.

11 Claims, 1 Drawing Sheet

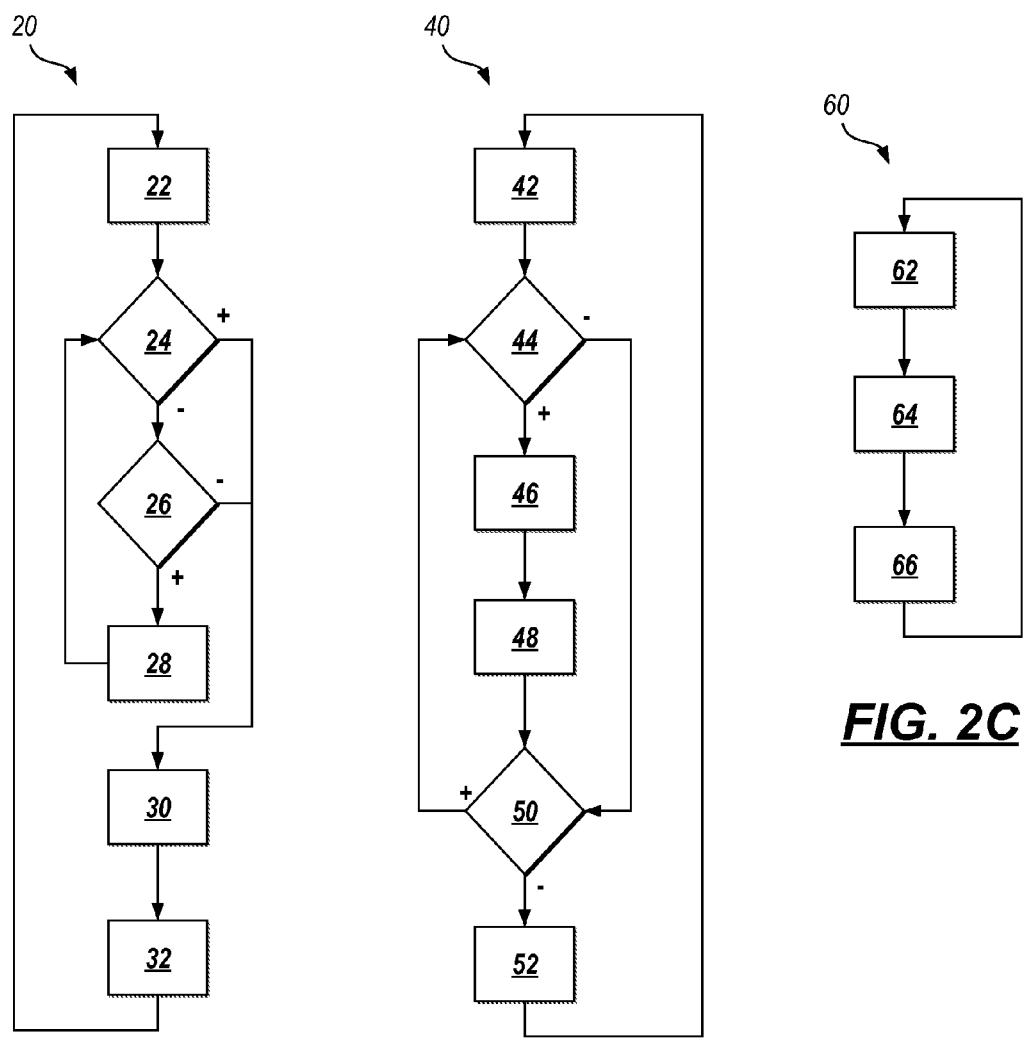

METHOD OF DISTRIBUTING PROCESSOR LOADING BETWEEN REAL-TIME PROCESSOR THREADS

TECHNICAL FIELD

The present invention relates generally to methods of transferring processing activity between different threads in a real-time processing environment.

BACKGROUND

A real time operating system is an operating environment for software that facilitates multiple time-critical tasks being performed by a processor according to predetermined execution frequencies and execution priorities. Such an operating system includes a complex methodology for scheduling various tasks such that the task is complete prior to the expiration of a deadline. In some data-intensive applications, movement of raw data and/or other processor-intensive tasks may be shared between tasks to ensure that the various deadlines are satisfied.

SUMMARY

A method of distributing processor loading in a real-time operating system between a high frequency processing task and a lower frequency processing task includes: making a processing request to the high frequency processing task from the lower frequency processing task, the processing request including a plurality of discrete processing commands; queuing the plurality of discrete processing commands; and executing a subset of the queued processing commands in each of a plurality of successive iterations of the high frequency processing task such that the execution of the plurality of discrete processing commands is distributed across the plurality of successive iterations of the high frequency processing task. The processing request may include, for example, copying a plurality of blocks of coherent data that are required for the execution of the lower frequency processing task.

In one configuration the method may further include determining a ratio of the execution frequency of the lower frequency processing task to the execution frequency of the high frequency processing task. The subset of processing commands executed at each iteration of the high frequency processing task may then be equal to the total number of initially queued processing commands multiplied by the determined ratio. Computing the number of tasks to be performed at each iteration may occur in a processing task separate from the high frequency processing task and the lower frequency processing task.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a flow diagram of a method of distributing processor loading in a real-time operating system between a high frequency processing task and a lower frequency processing task.

FIG. 2A is a flow diagram of a high-frequency processing task in a real-time operating system.

FIG. 2B is a flow diagram of a low frequency processing task in a real-time operating system.

FIG. 2C is a flow diagram of a very low frequency processing task in a real-time operating system.

DETAILED DESCRIPTION

Referring to the drawings, wherein like reference numerals are used to identify like or identical components in the various views, FIG. 1 schematically illustrates a method 10 of distributing processor loading in a real-time operating system between a high frequency processing task and a lower frequency processing task. As used herein, a "task" is a periodically executing computer code routine that is operative to perform one or more computational functions.

In a real-time operating system, multiple different processing tasks may be executed in a near synchronous manner. Each task may include a plurality of computations that may be performed on data made available to the processor. Each task may be assigned a priority level and an execution frequency that is based on the criticality and nature of the task, and the processor may attempt to schedule the execution of the tasks to ensure that each task is performed at its specified execution frequency.

In certain instances, tasks that are executed at a lower frequency may make processing requests of tasks that are executed at a higher frequency. For example, if the lower frequency task is operative to process certain sensory data, the lower-frequency task may request that a higher frequency task copy the data into a memory register so that it is accessible by the slower task when needed. In this manner, the lower frequency task may not be unduly delayed while awaiting the data transfer. In some instances, the lower frequency task may be the primary operating task, while higher frequency tasks may be reserved for data handling and/or may be generally subordinate to the requests of the lower frequency tasks.

It has been found that when a lower frequency processing task makes an unduly large processing request to a higher frequency processing task, the processing time needed to fulfill the request may exceed the target execution period allotted to the high frequency task (i.e., the target execution period being the inverse of the target execution frequency). In this manner, the high frequency task may exceed its completion deadline, resulting in a slower execution frequency than desired. This deviation from the ideal processing rate may affect time-critical tasks, and/or may negatively affect system stability.

With continued reference to FIG. 1, in a very general sense, the present method 10 distributes the processing request made to the high frequency task over a plurality of iterations of the high frequency task. For example, if the high frequency processing task executes each iteration 10 times for each iteration of the lower frequency task, then the processing request may be distributed over 10 separate high frequency task iterations, rather than performing the entirety of the request in one single execution/iteration.

The method 10 begins at step 12 when the lower frequency processing task makes a processing request to the high frequency processing task. The processing request may include a plurality of discrete processing commands, and may be identified by a function-call and/or a registry bit that alerts the high frequency processing task of a shared processing request. An example of a processing request may include a request to copy a collection of coherent data to memory associated with the processor. The collection of coherent data may be formed from a plurality of discrete blocks of data, which may each need to be separately marked and/or copied (i.e., resulting in multiple discrete processing commands).

After the request is made in step 12, the processor may queue the plurality of discrete processing commands in step 14. This command-queue may be made available to the high-frequency processing task as an on-going log of outstanding processing items.

In step 16, the processor may determine a maximum number of processing commands that may be executed at each iteration of the high frequency processing task such that the queued processing commands may be distributed across a plurality of iterations of the high frequency processing tasks. In one configuration, the maximum number of processing commands may be a function of the desired execution frequency of the lower frequency processing task, the desired execution frequency of the high frequency processing task, and the total number of requested commands in the queue. As such, the processor may first determine a ratio of the execution frequency of the lower frequency processing task to the execution frequency of the high frequency processing task. Once the ratio is known, the number of processing commands executed at each respective iteration of the high frequency processing task may equal to the total number of initially queued processing commands multiplied by the determined ratio.

In step 18, the processor may execute a subset of the queued processing commands with each iteration of the high frequency processing task. The total number of executed processing commands may be equal to the maximum number of commands determined in step 16. In this manner, the execution of the plurality of discrete processing commands may be distributed across the plurality of iterations of the high frequency processing task, yet may be complete prior to the start of the next iteration of the lower-frequency processing task.

In one configuration, the determination of the maximum number of processing commands that may be executed at each instance of the high frequency processing task (i.e., step 16) may occur in a processing task that is separate from the aforementioned high frequency processing task and the lower frequency processing task. For example, for reoccurring processing requests, the computation of the maximum number of tasks may occur in a processing task that has an even lower frequency than either of the other two tasks.

FIGS. 2A, 2B, and 2C schematically illustrate a high frequency processing task 20 (i.e., Task-0), a low frequency processing task 40 (i.e., Task-1), and a very low frequency processing task 60 (i.e., Task-2) that may embody the present method 10 being used to perform an operation chiefly within Task-1. As illustrated in FIG. 2B, Task-1 (40) may begin at 42, whereafter the processor may determine in 44 if the data is available in memory to process. If it is, Task-1 (40) may process the data in 46 and request new data for the subsequent iteration in 48. If the data is not yet available in 44, Task-1 (40) may check if more or other blocks are available to process in 50, and end at 52 if nothing is left to perform. The action of request new data for the subsequent iteration in 48 may include making a processing request to Task-0 (20) by adding a plurality of discrete processing commands to a processing queue. Task-1 (40) may then iterate at a first frequency.

Referring to FIG. 2A, Task-0 (20) may begin at 22, followed by a check at 24 to see if the queue is empty. If the queue is not empty, Task-0 (20) may check at 26 to see if the number of copied blocks is less than a "MaxBlocksPerTask." If so, Task-0 (20) may mark an additional block to be copied at 28. Otherwise, Task-0 (20) may proceed to copy any block that has been marked to be copied at 30 and end at 32. Task-0 (20) may then iterate at a second frequency that is faster than the first frequency of Task-1 (40). In one configuration Task-0 (20) may execute between 5 and 500 times more frequently than Task-1 (40).

Finally, referring to FIG. 2C, Task-2 (60) may begin at 62 and may determine the "MaxBlocksPerTask" variable in 64 by determining a ratio of the execution frequency of Task-1 (40) to the execution frequency of Task-0 (20), and multiplying that ratio by the total number of initially queued processing commands. Task-2 (60) may then end at 66, and iterate at a third frequency, which may be slower than both the first frequency of Task-1 (40) and the second frequency of Task-0 (20).

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of distributing processor loading in a real-time operating system between a high frequency processing task and a lower frequency processing task, the method comprising:

making a processing request to the high frequency processing task from the lower frequency processing task, the processing request including an initial number of discrete processing commands;

queuing the initial number of discrete processing commands;

determining a maximum number of discrete processing commands from the initial number of discrete processing commands that may be executed at each successive iteration of the high frequency processing task by determining a ratio of the execution frequency of the lower frequency processing task to the execution frequency of the high frequency processing task and multiplying the ratio by the initial number of discrete processing commands;

setting a subset of the queued initial number of discrete processing commands to have a number of discrete processing commands equal to the determined maximum number of discrete processing commands; and executing the subset of the queued initial number of discrete processing commands in each of a plurality of successive iterations of the high frequency processing task such that the execution of the plurality of discrete processing commands is distributed across the plurality of successive iterations of the high frequency processing task.

2. The method of claim 1, further comprising computing a number of processing commands to be executed in each of the plurality of successive iterations of the high frequency processing task.

3. The method of claim 2, wherein the computing occurs in a processing task separate from the high frequency processing task and from the lower frequency processing task.

4. The method of claim 1, wherein the plurality of discrete processing commands are completed prior to the next execution of the lower frequency processing task.

5. The method of claim 1, wherein the processing request includes copying a plurality of blocks of coherent data.

6. The method of claim 5, wherein the blocks of coherent data are required for the execution of the lower frequency processing task.

7. A method of distributing processor loading in a real-time operating system between a high frequency processing task and a lower frequency processing task, the method comprising:

making a processing request to the high frequency processing task from the lower frequency processing task, the processing request including an initial number of discrete processing commands;

queuing the initial number of discrete processing commands;

determining a maximum number of discrete processing commands from the initial number of discrete processing commands that may be executed at each successive iteration of the high frequency processing task by determining a ratio of the execution frequency of the lower frequency processing task to the execution frequency of the high frequency processing task and multiplying the ratio by the initial number of discrete processing commands;

setting a subset of the queued initial number of discrete processing commands to have a number of discrete processing commands equal to the determined maximum number of discrete processing commands; and executing the discrete processing commands in each of the plurality of successive iterations of the high frequency processing task such that the execution of the plurality of discrete processing commands is distributed across the plurality of successive iterations of the high frequency processing task during a single iteration of the low frequency processing task.

8. The method of claim 7, wherein the computing occurs in a processing task separate from the high frequency processing task and from the lower frequency processing task.

9. The method of claim 7, wherein the plurality of discrete processing commands are completed prior to the next execution of the lower frequency processing task.

10. The method of claim 7, wherein the processing request includes copying a plurality of blocks of coherent data.

11. The method of claim 10, wherein the blocks of coherent data are required for the execution of the lower frequency processing task.

\* \* \* \* \*